Nov. 26, 1957 R. C. LAMY 2,814,792
MAGNETIC CORE STORAGE DEVICE
Filed Aug. 25, 1955
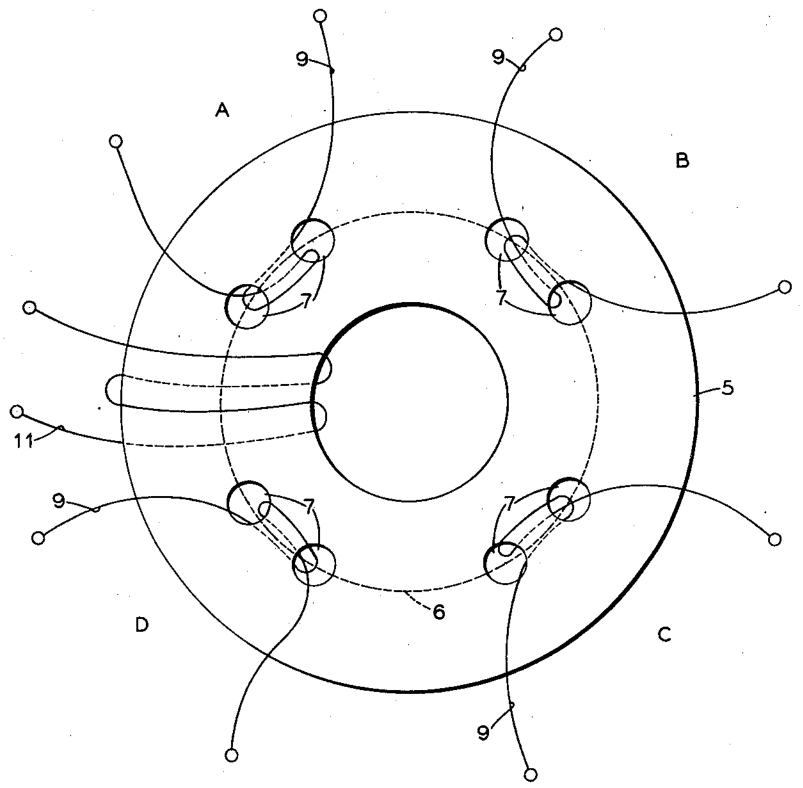
*INVENTOR.*
RICHARD C. LAMY
*BY* Paul M. Brannen
AGENT United States Patent Office 2,814,792

Patented Nov. 26, 1957

2,814,792

MAGNETIC CORE STORAGE DEVICE

Richard C. Lamy, Hyde Park, N. Y., assignor to International Business Machines Corporation, New York, N. Y., a corporation of New York Application August 25, 1955, Serial No. 530,491

8 Claims. (Cl. 340—174)

This invention relates to magnetic core storage devices, and particularly to an improved magnetic core storage device having a plurality of storage positions, capable of retaining stored information for as long a period as desired, and capable of successive interrogations without loss of the stored information.

It has previously been proposed to provide magnetic core storage devices in which a core of suitable magnetic material is placed in one or the other of its two stable states of remanent flux by application of pulses of suitable polarity and magnitude to an input winding on the core. Such devices are characterized by the ability to store one binary "bit" of information, such a binary "bit" having a value of either zero or one, depending upon the sense of the remanent flux in the core. Thus a separate magnetic core is required for storing each "bit" of information. It has also been proposed to interrogate such cores to determine the value of the "bit" stored therein by energizing a winding on the core with current of a selected polarity and magnitude sufficient to switch the core to a predetermined one of its two stable states of remanent flux. If the core is already in the selected state, only a small flux change occurs in the core, whereas if the core is in the non-selected state, a relatively large flux change takes place in the core. Such flux changes are utilized to induce voltages in an output winding mounted on the core, the magnitude of these voltages being indicative of the value of the "bit" stored in the core. It is obvious that such a method of interrogation results in destruction of the information stored in the core, so that subsequent interrogations will not produce output pulses which are capable of indicating the value of the "bit" of information stored in the core prior to the first interrogation, if such a value is represented by the core being in its non-selected state of remanent flux.

Accordingly, an object of this invention is to provide a magnetic core storage device capable of storing a plurality of "bits" of information.

Another object of this invention is to provide a magnetic core storage device capable of independently storing a plurality of "bits" of information which may be repeatedly interrogated to determine the value of the information thus stored.

A further object of this invention is to provide a magnetic core storage device comprising a single core of magnetic material provided with a plurality of information storage positions each capable of having independent "bits" of information stored therein, and which information may be repeatedly interrogated to determnie the value of the information.

A further object of this invention is to provide a pulse transfer controlling device having a plurality of information storage positions.

Another object of the invention is to provide an improved magnetic core storage device.

In accordance with the invention, a single magnetic core is provided with a plurality of storage positions, each position comprising a winding arranged with its axis substantially at right angles to the center line of the core, so that the magnetic flux set up in the core by energization of any one of the windings is substantially at right angles with respect to the principal flux path of the core. Preferably, but not necessarily, the winding for each storage position is formed by threading one or more turns of wire through a pair of spaced openings through the core, these openings intersecting the center line of the core. As herein employed, the term "center line" is defined as a line connecting the center of each and every cross-sectional area of the core, in accordance with the usual sense of the word. In addition to the storage position windings, a common sensing or sampling winding is provided for the core, this winding taking the conventional form of one or more turns which are wound about the core.

Other objects of the invention will be pointed out in the following description and claims and illustrated in the accompanying drawing, which discloses, by way of example, the principle of the invention and the best mode, which has been contemplated, of applying that principle.

The single accompanying drawing is a schematic illustration of a preferred embodiment of the invention in which a single core of magnetic material is provided with four independent storage positions.

Referring to the drawing, the reference character 5 designates a toroidal core of magnetic material, preferably of the type commonly used in magnetic core storage devices characterized by relatively low coercive force and a high permeability.

Such material may be placed in a relative positive or negative stable state of residual magnetization by application thereto of a magnetizing force of sufficient magnitude and selected direction.

At each of a plurality of positions located circumferentially around the core, and designated generally by the reference characters A, B, C and D, there is provided a pair of spaced openings 7, drilled or otherwise formed in the core material. Preferably these openings pass through the center line 6 of the core, and the openings comprising a pair are spaced apart by a distance comparable to the thickness of the core. As shown in the figure the holes are assumed perpendicular to the plane of the core but they may be positioned radially or at other angles as desired.

A storage winding 9, comprising one or more turns, is provided for each of the storage positions, and as seen from the drawing, is threaded through the pair of spaced openings 7 to provide a winding having its axis substantially perepndicular to the center line of the core.

A common sampling winding 11 is also provided, this winding being of conventional form wound around the core as shown.

Suitable terminals are provided for each of the windings, for the purpose of connecting the windings to suitable energizing current or, in the case of the storage windings, to alternatively connect the windings to suitable voltage indicating devices. Such auxiliary apparatus is not shown or described, since it forms no part of this invention and may take any one of several well-known forms.

In operation, information may be independently stored in any one or more of the four storage positions A, B, C and D, by supplying to the associated storage winding a pulse of current of appropriate magnitude and of selected relative polarity. The windings may be pulsed serially, in any order whatsoever, or may be pulsed simultaneously, or in any combination, without affecting one another.

After information has been stored in one or more of the storage positions, the supply of a pulse of current of suitable magnitude and a selected polarity to the sampling winding 11 will cause output voltages to be induced in each of the storage windings associated with storage positions A, B, C and D. For a given relative polarity of the pulse supplied to the sampling winding 11, the relative polarity of the output voltages induced in the storage windings will be dependent only upon the relative polarity of the last input pulse supplied to the windings. Moreover, the read-in or readout of information stored in one position does not affect the information stored in any of the other positions. Furthermore, the sampling winding 11 may be repeatedly pulsed to obtain output voltages from the storage windings without causing any change in the polarity of the output voltages.

It can be seen from the foregoing that a magnetic storage device constructed in accordance with this invention may be employed to store separate "bits" of information in a plurality of storage positions, without any interdependence between the information stored in one position and the information stored in another position, and that repetitive interrogation of the stored information may be had.

It is to be understood that various types of core geometries are possible and that the arrangement is not limited to the toroidal form shown and described. Also the number of storage positions is limited only by the relative size of the core, more or less than four positions being possible.

While there have been shown and described and pointed out the fundamental novel novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic storage element comprising a closed magnetic circuit capable of assuming a first or a second remanent flux state, a plurality of storage positions for said circuit, each of said storage positions comprising a winding having its axis perpendicular to and intersecting the principal flux path of said magnetic circuit, and a sampling winding linking said magnetic circuit, effective when energized to create closed flux lines circulating in said magnetic circuit.

2. A magnetic core storage device comprising a closed core of magnetic material capable of assuming a first or a second remanent flux state, a plurality of storage positions for said core, each of said storage positions comprising a winding having its axis perpendicular to and intersecting the center line of said core, and a sampling winding positioned on said core, effective when energized to create closed flux lines circulating in said core.

3. A magnetic core storage device comprising a closed core of magnetic material capable of assuming a first or a second remanent flux state, said magnetic material having a relatively high permeability, a plurality of storage positions for said core, each of said storage positions comprising a winding having its axis perpendicular to and intersecting the center line of said core, and a sampling winding linking said core, effective when energized to create closed flux lines circulating in said core.

4. A pulse transfer controlling device comprising, in combination, a core of magnetic material capable of assuming a first or a second remanent magnetic flux state and winding means associated with said core, including a plurality of storage windings, each of said storage windings having a plurality of turns and having its axis perpendicular to and intersecting the center line of said core.

5. A magnetic core storage device comprising a closed toroidal core of magnetic material capable of assuming a first or a second remanent flux state, a sampling winding mounted on said core, and a plurality of storage windings for said core, each of said storage windings linking a portion of said core at right angles to the center line of said core.

6. A magnetic core storage device comprising a closed core of magnetic material capable of assuming a first or a second remanent flux state, a plurality of storage positions spaced along said core, each of said storage positions comprising a pair of spaced openings extending through said core and a storage winding threaded through said pair of openings, and a common sampling winding positioned on said core.

7. A magnetic storage device comprising a closed toroidal core of magnetic material having a high permeability capable of assuming a first or a second remanent flux state, a sampling winding mounted on said core, and a plurality of storage windings mounted on said core, each of said storage windings being oriented to create flux in an associated portion of said core which is substantially perpendicular to the center line of said core.

8. A magnetic storage device comprising a closed magnetic core capable of assuming a first or a second remanent flux state, a sampling winding mounted on said core, a plurality of pairs of spaced parallel openings distributed along said core and passing substantially through the center line of the core, and a plurality of storage windings, one for each of said pairs of spaced openings, said storage windings being threaded through the associated pair of spaced openings to link the portion of said core between the openings.

References Cited in the file of this patent

UNITED STATES PATENTS

2,732,542 Minnick ---------------- Jan. 24, 1956